US010253903B2

(12) United States Patent
Fujimoto et al.

(10) Patent No.: US 10,253,903 B2
(45) Date of Patent: Apr. 9, 2019

(54) MOTOR-OPERATED VALVE

(71) Applicant: PACIFIC INDUSTRIAL CO., LTD., Ogaki-shi, Gifu-ken (JP)

(72) Inventors: Satoshi Fujimoto, Anpachi-gun (JP); Terumasa Mitsu, Motosu (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 0 days.

(21) Appl. No.: 15/510,733

(22) PCT Filed: Jun. 23, 2016

(86) PCT No.: PCT/JP2016/068644
§ 371 (c)(1),
(2) Date: Mar. 13, 2017

(87) PCT Pub. No.: WO2017/221370
PCT Pub. Date: Dec. 28, 2017

(65) Prior Publication Data
US 2017/0370499 A1 Dec. 28, 2017

(51) Int. Cl.
*F16K 31/04* (2006.01)
*F16K 47/04* (2006.01)
*F16K 1/12* (2006.01)
*F16K 1/38* (2006.01)

(52) U.S. Cl.
CPC ................ *F16K 47/04* (2013.01); *F16K 1/12* (2013.01); *F16K 1/38* (2013.01); *F16K 31/04* (2013.01)

(58) Field of Classification Search
CPC ...... F16K 31/04; F16K 31/041; F16K 31/043; F16K 31/047
(Continued)

(56) References Cited

U.S. PATENT DOCUMENTS 6,492,751 B1 * 12/2002 Ineson .................. H02K 1/145 251/129.11
7,165,755 B2 * 1/2007 Umezawa ............ F16K 31/047 251/129.11

(Continued)

FOREIGN PATENT DOCUMENTS

CN 1297518 A 5/2001
CN 1743708 A 3/2006

(Continued)

OTHER PUBLICATIONS

Sep. 13, 2016 International Search Report issued in PCT/JP2016/068644.

(Continued)

*Primary Examiner* — Ian G Paquette
(74) *Attorney, Agent, or Firm* — Oliff PLC

(57) ABSTRACT

A motor-operated valve includes a base portion which is provided at one end of a stator, a linear-motion shaft which is screwed into a rotor and which is supported by the base portion such that the linear-motion shaft can be moved linearly and cannot be rotated, and a valve member which is provided in the linear-motion shaft and which opens and closes the valve port. A first contacting portion on the rotor and a second contacting portion on the stator or an intermediate member disposed between the rotor and the stator, the first and the second contacting portions and being provided in each of the intermediate member or the stator and the rotor, and contacting with each other in the rotation axis direction of the rotor are biased by a rotor biasing means such that they are pressed onto each other.

19 Claims, 8 Drawing Sheets

(58) Field of Classification Search
USPC ........................... 251/129.11, 129.12, 129.13
See application file for complete search history.

(56) References Cited

U.S. PATENT DOCUMENTS

| | | | | |
|---|---|---|---|---|
| 9,657,656 | B2 * | 5/2017 | Weldon | F02D 31/003 |
| 2013/0206851 | A1 * | 8/2013 | Sekiguchi | F16K 31/04<br>236/92 B |
| 2013/0263955 | A1 * | 10/2013 | Hirota | F16K 31/04<br>137/636 |

FOREIGN PATENT DOCUMENTS

| | | | |
|---|---|---|---|
| CN | 103245138 | A | 8/2013 |
| JP | H10-169821 | A | 6/1998 |
| JP | H1122846 | A | 1/1999 |
| JP | H11-62848 | A | 3/1999 |
| JP | 2000291817 | A | 10/2000 |
| JP | 200561793 | A | 3/2005 |
| JP | 2006307964 | A | 11/2006 |
| JP | 2014163332 | A | 9/2014 |
| JP | 201689870 | A | 5/2016 |

OTHER PUBLICATIONS

Sep. 13, 2016 Written Opinion of the International Search Authority issued in PCT/JP2016/068644.
Jul. 10, 2018 Office Action issued in Chinese Patent Application No. 201680002819.9.

* cited by examiner

MOTOR-OPERATED VALVE

TECHNICAL FIELD

The present invention relates to a motor-operated valve which includes a motor as a drive source.

BACKGROUND ART

As a conventional motor-operated valve, a motor-operated valve is known in which a linear-motion shaft having a valve member at a tip end is driven by a motor (for example, see patent literature 1).

RELATED ART DOCUMENTS

Patent Documents

Patent Document 1: Japanese Unexamined Patent Application Publication No. H10-169821 (paragraph [0007] and FIG. 1)

SUMMARY OF THE INVENTION

Problems to be Solved by the Invention

Disadvantageously, in the conventional motor-operated valve described above, a rotor rattles relative to a stator, and thus a vibration sound is produced.

The present invention is made in view of the foregoing circumstances, and has an object to provide a motor-operated valve which can reduce a vibration sound.

Means of Solving the Problems

In order to achieve the above object, a motor-operated valve according to the present invention includes a motor, a base portion which is provided at one end of a stator of the motor, a linear-motion shaft which is screwed into a rotor of the motor and which is supported by the base portion such that the linear-motion shaft can be moved linearly and cannot be rotated, a valve port which is formed in the base portion, a valve member which is provided at one end of the linear-motion shaft and which opens and closes the valve port, a first contacting portion on the rotor and a second contacting portion on the stator or on an intermediate member disposed between the rotor and the stator, the first and the second contacting portions being provided in each of the intermediate member or the stator and the rotor and contacting each other in a rotation axis direction of the rotor, and a rotor biasing means which biases the rotor in the rotation axis direction such that the first contacting portion and the second contacting portion are pressed onto each other.

MODE FOR CARRYING OUT THE INVENTION

First Embodiment

Figure 1:
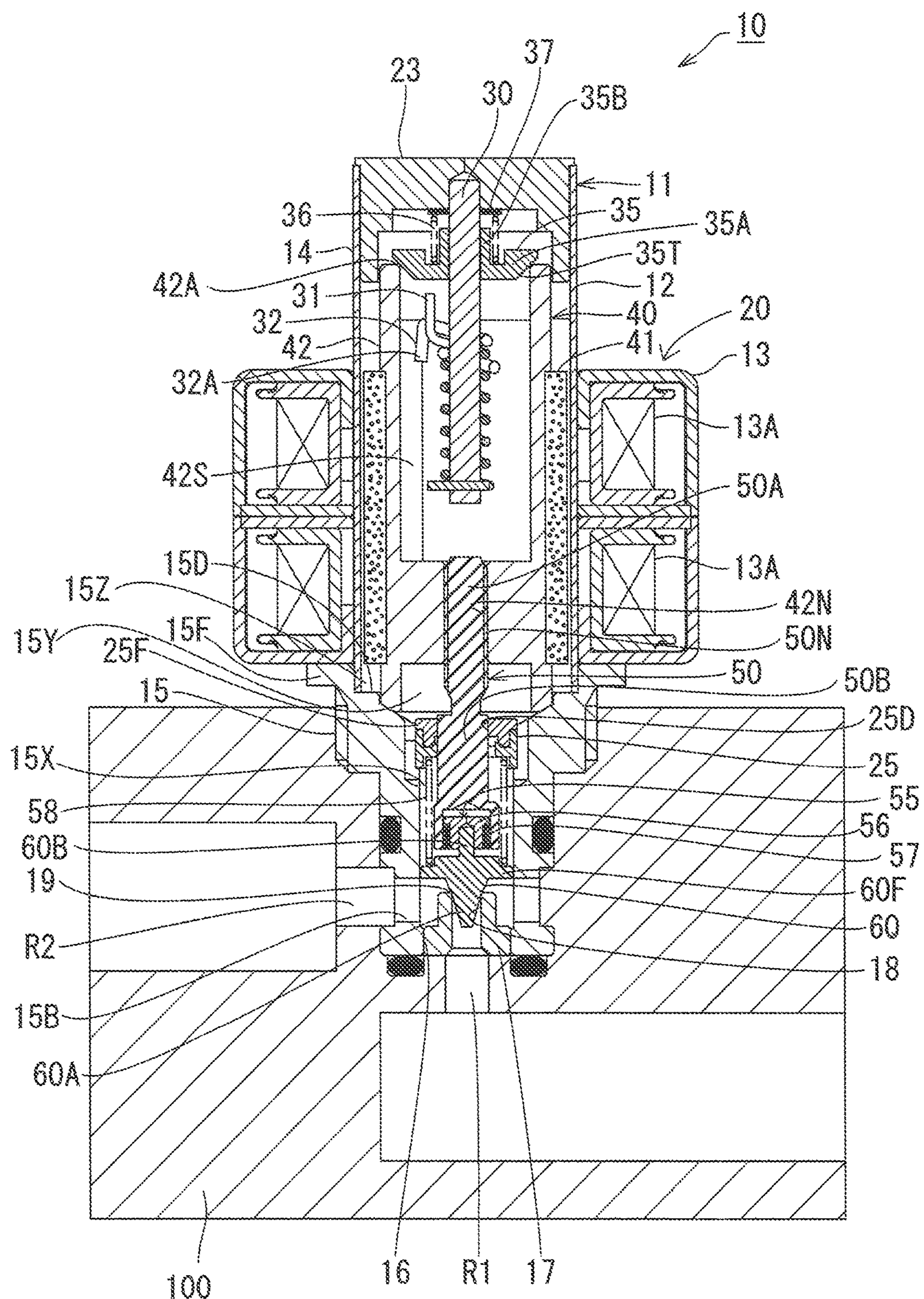
FIG. 1 is a side cross-sectional view of a motor-operated valve according to a first embodiment of the present invention.

The first embodiment of the present invention will be described below with reference to FIGS. 1 to 5. As shown in FIG. 1, a motor-operated valve 10 of the present embodiment includes a stator 11, a rotor 40 which is rotatably accommodated inside the stator 11, and a linear-motion shaft 50 which is linearly moved inside the stator 11 by the rotation of the rotor 40.

The stator 11 is formed by fixing a stator-side field portion 13 to the outside of a sleeve 12 which is extended vertically. The stator-side field portion 13 is formed in the shape of an annular ring, and includes electromagnetic coils 13A aligned.

The sleeve 12 is formed of an upper cylindrical portion 14 and a lower cylindrical portion 15 (which corresponds to a "base portion" in the present invention), and the upper cylindrical portion 14 and the lower cylindrical portion 15 are arranged coaxially. The upper cylindrical portion 14 is formed in the shape of a cylinder which has substantially the same diameter as a whole, and an opening in its upper surface is hermetically sealed with a lid member 23. The stator-side field portion 13 described above is fixed to a lower end portion of the upper cylindrical portion 14. The sleeve 12, the lid member 23, and the stator-side field portion 13 form the "main body of the stator" in the present invention.

As shown in FIG. 1, the lower cylindrical portion 15 includes, therewithin, a valve member linear-motion room 15X which is extended from a lower end portion to an intermediate portion, a rotor receiving portion 15Y which is located above the valve member linear-motion room 15X and which has a larger diameter than that of the valve member linear-motion room 15X, and an upper end receiving portion 15Z which is located above the rotor receiving portion 15Y and which has a larger diameter than that of the rotor receiving portion 15Y. Among them, the lower end portion of the upper cylindrical portion 14 is fitted to the upper end receiving portion 15Z, and thus the upper cylindrical portion 14 and the lower cylindrical portion 15 are coupled to each other. The upper cylindrical portion 14 and the lower cylindrical portion 15 are welded together in a state where the lower end surface of the upper cylindrical portion 14 abuts against an annular step portion 15D which is the inner surface of the upper end receiving portion 15Z and where a flange 15F which is extended laterally from an upper end of the lower cylindrical portion 15 contacts with the lower surface of the stator-side field portion 13.

A valve seat member 17 is fitted into an opening portion 16 on the lower end side of the lower cylindrical portion 15. The valve seat member 17 is formed in the shape of a cylinder, and its upper end opening is a valve port 18. In addition, in the lower cylindrical portion 15, a side portion opening 15B which is open laterally is formed in a position close to the lower end. A first flow path R1 is connected to the valve seat member 17, and a second flow path R2 is connected to the side portion opening 15B.

Figure 2:
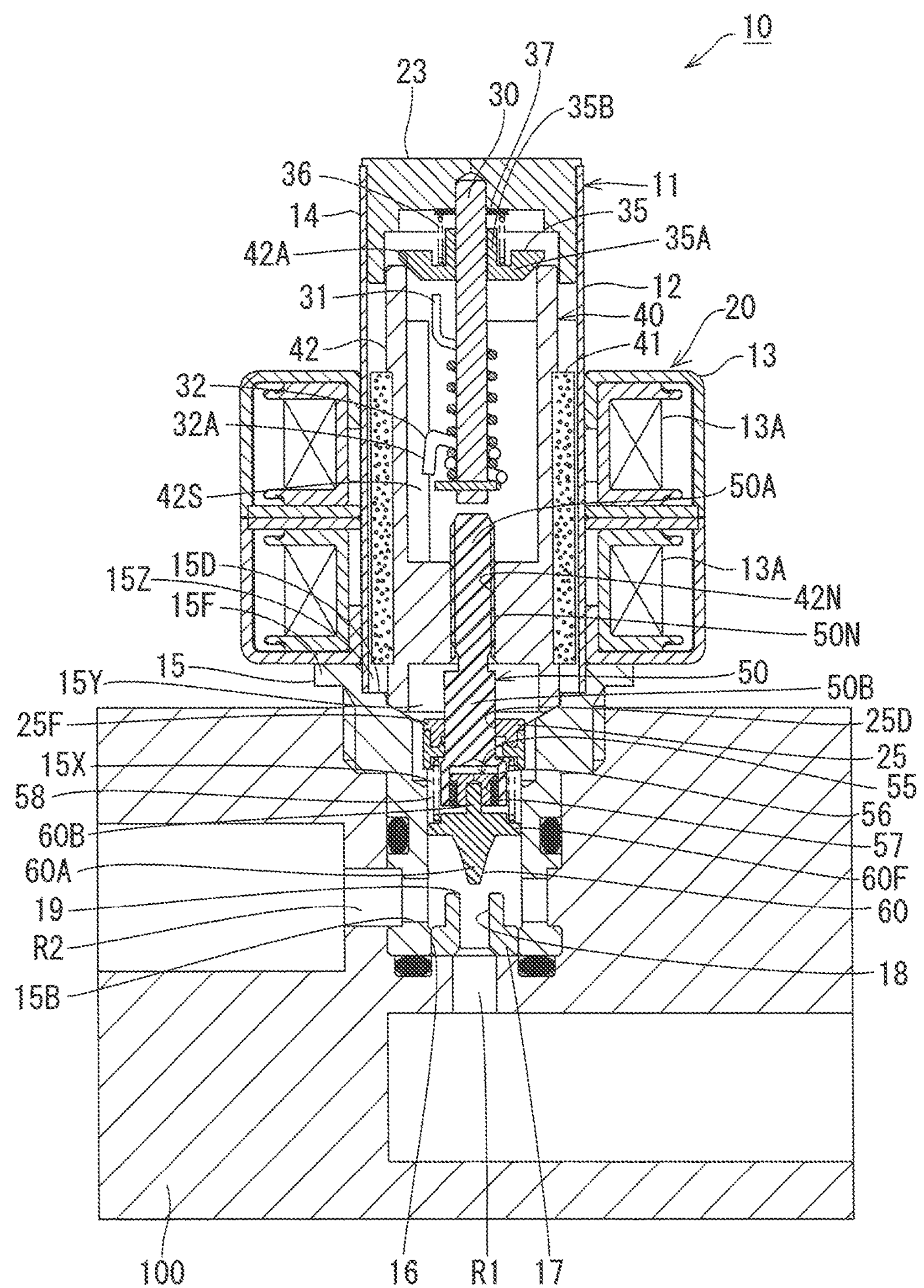
FIG. 2 is a side cross-sectional view of the motor-operated valve in a state where a valve port is open.

The valve port 18 is opened and closed by a valve member 60 which is provided at the tip end of the linear-motion shaft 50. The valve member 60 is formed in the shape of a truncated cone whose diameter is decreased toward the tip end portion, and as shown in FIG. 1, the valve member 60 enters into the valve port 18 from above, contacts with a valve seat 19 and thereby closes the valve port 18, with the result that the flow is regulated. And, as shown in FIG. 2, the valve member 60 is moved upward to open the valve port 18, and thus the flow between the first flow path R1 and the second flow path R2 becomes possible.

Figure 3:
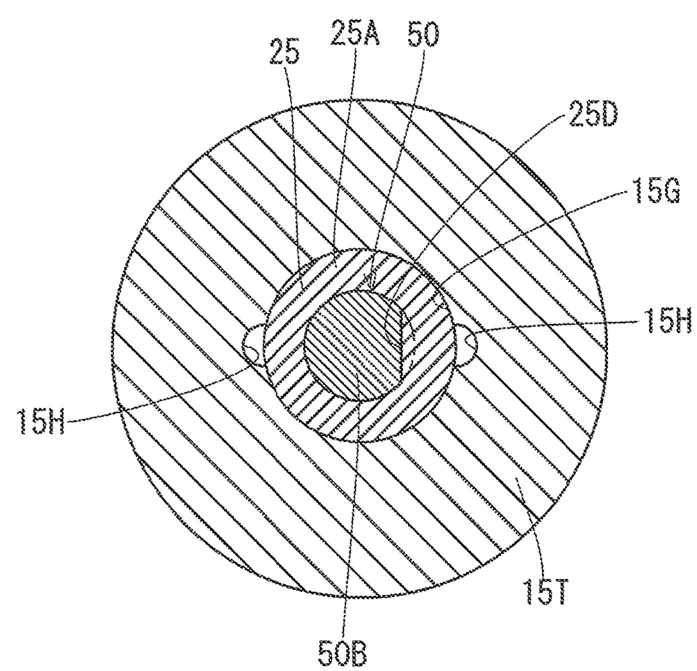
FIG. 3 is a horizontal cross-sectional view in the vicinity of a shaft support member.

The linear-motion shaft 50 having the valve member 60 is supported such that the linear-motion shaft 50 can be moved linearly and cannot be rotated with respect to the lower cylindrical portion 15. Specifically, as shown in FIGS. 1 and 3, an intermediate part of the linear-motion shaft 50 in an vertical direction is formed into a sliding shaft portion 50B whose cross section is formed in the shape of the letter D, and is received by a shaft support member 25 attached to the upper end portion of the valve member linear-motion room 15X in the lower cylindrical portion 15. The shaft support member 25 is formed substantially in the shape of a cylinder, has a shaft receiving hole 25D in the shape of the letter D which corresponds to the cross section of the sliding shaft portion 50B in the shape of the letter D and thereby regulates the rotation of the linear-motion shaft 50.

Figure 4:
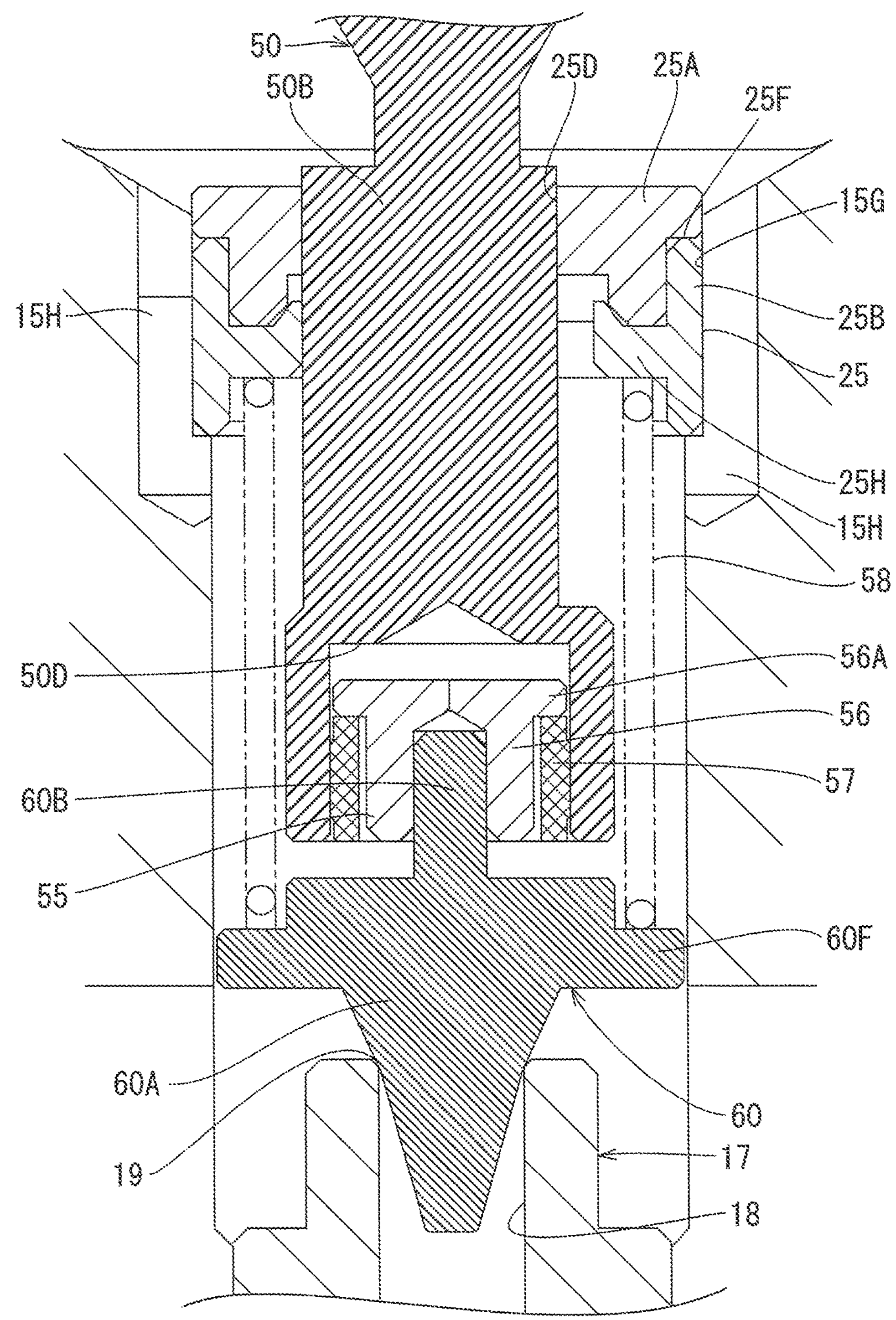
FIG. 4 is a side cross-sectional view in the vicinity of a valve member component.

As shown in FIG. 4, the shaft support member 25 includes an upper member 25A and a lower member 25B. The upper member 25A has a smaller diameter than that of the lower member 25B, and is received inside the lower member 25B. At the upper end of the upper member 25A, a flange 25F which is extended laterally is provided, and the lower surface of the flange 25F contacts with the upper end of the lower member 25B. On the other hand, in a position of the lower member 25B close to the lower end, a protruding annular plate 25H which is extended inward and which is opposed to the lower end surface of the upper member 25A is provided. The shaft receiving hole 25D whose cross section is formed in the shape of the letter D is formed in the upper member 25A.

On the circumferential portion of a receiving portion 15G which receives the shaft support member 25 in the lower cylindrical portion 15, as shown in FIG. 3, two communication holes 15H are formed, and thus the pressures of upper and lower spaces separated by the shaft support member 25 are made substantially uniform.

As shown in FIG. 1, the rotor 40 is formed by fixing a rotor-side field portion 41 having magnetic properties to the outside of a cylindrical rotary screwing cylinder 42. A stepping motor 20 which corresponds to a "motor" in the present invention is constituted mainly of the rotor-side field portion 41 and the stator-side field portion 13, and the excitation pattern of the electromagnetic coils 13A in the stator-side field portion 13 is changed, with the result that the rotor-side field portion 41 is controlled to be positioned in a predetermined rotation position. The rotor-side field portion 41 is arranged upward from a position of the rotary screwing cylinder 42 close to the lower end, and the lower end portion of the rotary screwing cylinder 42 in the rotor 40 is received in the rotor receiving portion 15Y of the stator 11.

The rotary screwing cylinder 42 is formed in the shape of a cylinder whose both ends are open, and on the inner side of the position close to the lower end, a female screw portion 42N is formed. Above the sliding shaft portion 50B in the linear-motion shaft 50, a male screw portion 50N is formed on the outer surface, and the male screw portion 50N is screwed into the female screw portion 42N of the rotary screwing cylinder 42.

The rotor 40 is rotated with respect to the stator 11 in a state where the rotor 40 is positioned in the axial direction by a positioning mechanism which will be described later. In accordance with this rotation, the linear-motion shaft 50 unrotatably supported to the lower cylindrical portion 15 of the stator 11 is moved linearly by screwing into the rotary screwing cylinder 42, and consequently the linear-motion position of the valve member 60 is changed.

In the motor-operated valve 10, components which will be described below are provided in order to regulate the amount of rotation of the rotor 40. That is, as shown in FIG. 1, a guide shaft 30 which is hung down from the lid member 23 is provided in the stator 11. A spiral guide 31 is fixed to the guide shaft 30. The spiral guide 31 is formed by winding wires spirally around a lower portion of the guide shaft 30.

A stopper ring 32 is engaged with the spiral guide 31. The stopper ring 32 is formed in the shape of a ring which is held in part of a gap between the wires of the spiral guide 31 adjacent to each other in the axial direction and includes a stopper arm 32A which is extended laterally. On the inner surface of the rotary screwing cylinder 42 of the rotor 40, ring contacting portions 42S, 42S (in FIG. 1, only the ring contacting portion 42S on the back side is shown) are formed which are arranged above the female screw portion 42N so as to be extended in the vertical direction and to sandwich the stopper arm 32A. When the rotor 40 is rotated, the stopper ring 32 is pushed by the ring contacting portions 42S, rotated relative to the spiral guide 31, moved upward and downward, and becomes unrotatable when moving to the upper end portion or the lower end portion of the spiral guide 31. In this way, the amount of rotation of the rotor 40 is regulated.

Next, the positioning mechanism of the rotor 40 will be described. As shown in FIG. 1, a pressing member 35 which corresponds to an "intermediate member" in the present invention is provided between the lid member 23 and the rotor 40 in the upper cylindrical portion 14 of the stator 11. The pressing member 35 includes a main plate portion 35A formed in the shape of an annular plate which is bulged downward and a support cylindrical portion 35B which stands upward from its inner edge. The pressing member 35 is supported by inserting the guide shaft 30 through the inside of the support cylindrical portion 35B such that the pressing member 35 can be moved linearly and can be rotated. In other words, in the present embodiment, the guide shaft 30 which regulates the amount of rotation of the rotor 40 is used also for the support of the pressing member 35.

In the outer edge portion of the main plate portion 35A in the pressing member 35, a tapered surface 35T is formed, and the tapered surface 35T contacts with an upper end opening edge 42A of the rotary screwing cylinder 42 in the rotor 40. The upper end opening edge 42A is chamfered so as to form a small tapered surface. The spiral guide 31 of the guide shaft 30 is arranged at a place lower than the pressing member 35.

In addition, between the pressing member 35 and the lid member 23, a compression coil spring 36 (which corresponds to a "rotor biasing means" and an "elastic member" in the present invention) is arranged so as to be stuck therebetween. The pressing member 35 is biased downward by the compression coil spring 36 so as to press the rotor 40 onto the inner surface of the rotor receiving portion 15Y. Accordingly, the rotor 40 is positioned in the axial direction. In the present embodiment, it is configured such that the pressing member 35 and the compression coil spring 36 are rotated as the rotor 40 is rotated, and the compression coil spring 36 makes sliding contact with a sliding contact plate 37 provided on the lid member 23. However, for example, a configuration may be adopted in which the pressing member 35 cannot be rotated or is unlikely to be rotated and in which the rotor 40 makes sliding contact with respect to the pressing member 35.

Figure 5:
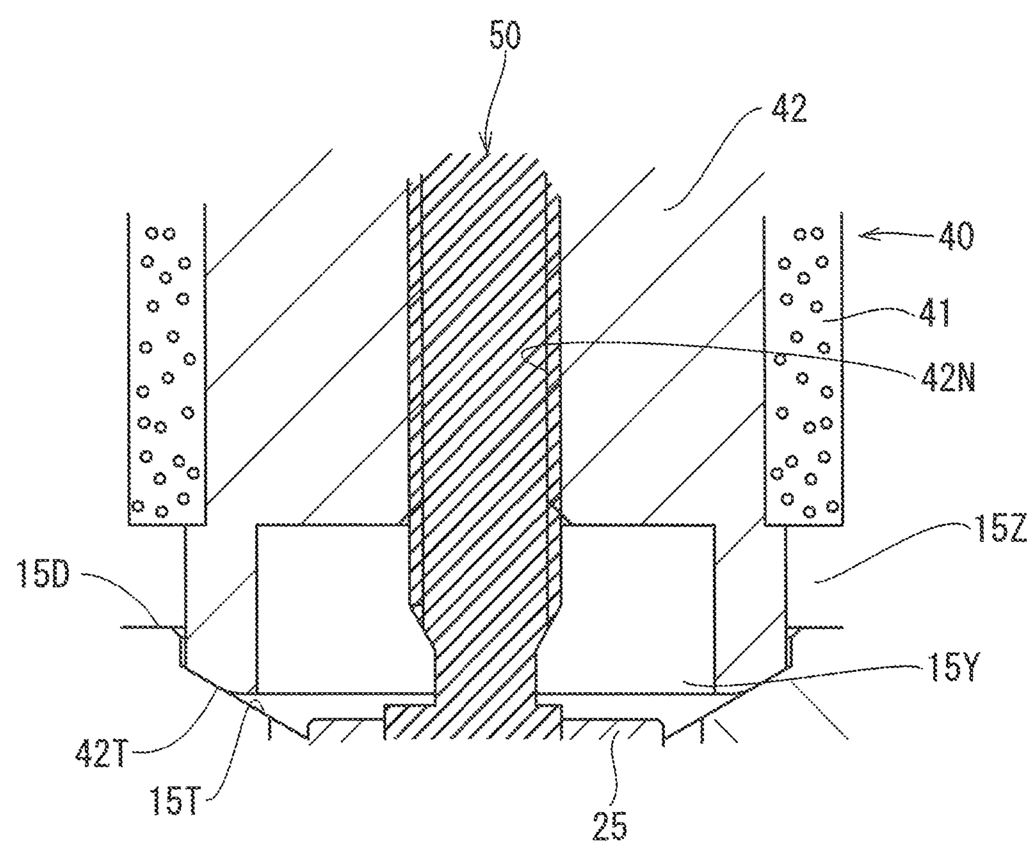
FIG. 5 is a side cross-sectional view in the vicinity of a rotor receiving portion.

As shown in FIG. 5, the inner surface of the rotor receiving portion 15Y in the lower cylindrical portion 15 is a tapered surface 15T which is extended downward toward the center. Also in the lower edge surface of the rotary screwing cylinder 42 in the rotor 40, a tapered surface 42T which is tapered is formed, the rotor 40 is biased downward by the pressing member 35 and thus these tapered surfaces 15T and 42T surface contact with each other, with the result that the rotor 40 is centered with respect to the stator 11. The inclination angle of the tapered surface 15T of the lower cylindrical portion 15 is substantially equal to that of the tapered surface 42T of the rotary screwing cylinder 42. The inclination angles of these tapered surfaces 15T and 42T are preferably set to such an angle (for example, 15 degrees or less) that the rotary screwing cylinder 42 is prevented from being press-fitted into the deep portion of the rotor receiving portion 15Y.

The upper end opening edge 42A and the tapered surface 42T of the rotary screwing cylinder 42 in the rotor 40 correspond to a "first contacting portion" in the present invention, and the tapered surface 35T of the pressing member 35 and the tapered surface 15T of the lower cylindrical portion 15 correspond to a "second contacting portion" in the present invention.

As shown in FIG. 1, the linear-motion shaft 50 is extended in the vertical direction, and a valve member component 55 including the valve member 60 is attached to the lower end portion of a shaft main body 50A which includes the sliding shaft portion 50B and the male screw portion 50N. Specifically, as shown in FIG. 4, in the center portion of the lower end surface of the shaft main body 50A in the linear-motion shaft 50, a coupling hole 50D is bored, and the upper end portion of the valve member component 55 is accommodated in the coupling hole 50D.

The valve member component 55 will be described below. As shown in FIG. 4, the valve member component 55 includes the valve member 60 and a retaining member 56 which is fixed to the upper end portion of the valve member 60 by, for example, press-fitting, welding, etc. The valve member 60 includes a valve member main body portion 60A that is formed in the shape of a truncated cone which is tapered downward, a shaft portion 60B that is extended upward from the center of the upper surface of the valve member main body portion 60A, and a flange 60F that is extended laterally from a position of the valve member main body portion 60A close to the upper end. The flange 60F is extended further laterally than the linear-motion shaft 50.

The retaining member 56 is formed in the shape of a cylinder which has a bottom in its upper end and which receives the shaft portion 60B of the valve member 60, and in its upper end, a flange-shaped locking wall 56A is formed. And, in a state where the flange-shaped locking wall 56A is inserted in the coupling hole 50D, a retaining ring 57 is press-fitted into the lower end portion of the coupling hole 50D, and thus the base end portion of the valve member component 55 is retained in the coupling hole 50D. In addition, since the coupling hole 50D is formed so as to be deeper than the total length of the retaining member 56, the retaining member 56 can be linearly moved inside the coupling hole 50D. Consequently, the valve member 60 which is fixed to the retaining member 56 can be moved linearly with respect to the linear-motion shaft 50. The retaining member 56, the coupling hole 50D and the retaining ring 57 correspond to a "linear-motion coupling mechanism" in the present invention.

A compression coil spring 58 (which corresponds to a "shaft biasing means," a "valve member biasing means" and a "rotor biasing means" in the present invention) is arranged between the flange 60F of the valve member 60 and the protruding annular plate 25H of the shaft support member 25 in the stator 11. Thereby, the valve member 60 is biased to the valve port 18 side. Furthermore, the valve member 60 is biased downward with respect to the stator 11, and thus the linear-motion shaft 50 is also biased downward with respect to the stator 11, and the rotor 40 is also biased downward. The flange 60F of the valve member 60 corresponds to a "pressure receiving portion" in the present invention, and the protruding annular plate 25H of the shaft support member 25 corresponds to an "opposing portion" in the present invention.

The configuration of the present embodiment has been described above. Next, the actions and effects of the present embodiment will be described. The motor-operated valve 10 of the present embodiment is incorporated in, for example, a body 100 (see FIG. 1). And, the rotor 40 is rotated by receiving an excitation of the stator-side field portion 13, thus the linear-motion shaft 50 which has the valve member 60 is linearly moved by being screwed into the rotary screwing cylinder 42 of the rotor 40 and the opening degree of the valve is changed, and accordingly a flow rate of coolant flowing between the first flow path R1 and the second flow path R2 is changed.

Here, in the motor-operated valve 10 of the present embodiment, the rotor 40 is rotated in a state where the rotor 40 is pressed onto the inner surface (the tapered surface 15T) of the rotor receiving portion 15Y in the stator 11 by the pressing member 35 and the compression coil spring 36, and thus it is possible to prevent the rotor 40 from rattling in the axial direction enabling to reduce a vibration sound as compared with a conventional case.

Furthermore, since the tapered surfaces 15T and 42T are respectively formed in the inner surface of the rotor receiving portion 15Y and the lower end surface of the rotary screwing cylinder 42 in the rotor 40, and surface contact with each other, the rotor 40 is centered with respect to the stator 11 and thus the rotor 40 is prevented from rattling in the radial direction as well, enabling to further reduce a vibration sound.

In addition, the tapered surface 35T is formed also in the pressing member 35 and contacts with the tapered upper end opening edge 42A of the rotary screwing cylinder 42 and accordingly the rotor 40 is further centered with respect to the stator 11.

Moreover, since in the present embodiment, the valve member 60 is coupled to the linear-motion shaft 50 such that the valve member 60 can be linearly moved with respect to the linear-motion shaft 50, it is possible to absorb an impact resulting from the valve member 60 contacting with the opening edge of the valve port 18, and it is also possible to obtain a contact pressure between the valve member 60 and the opening edge of the valve port 18 by the compression coil spring 58.

Furthermore, regardless of the open state of the valve port 18, the linear-motion shaft 50 together with the valve member 60 is biased downward with respect to the rotor 40 by the compression coil spring 58, and thus it is possible to reduce a vibration sound caused by a rattle between the linear-motion shaft 50 and the rotor 40. In addition, the linear-motion shaft 50 is biased downward, and thus the rotor 40 is also biased downward enabling to further enhance the pressing of the rotor 40 onto the inner surface of the rotor receiving portion 15Y.

Still further, in the present embodiment, the compression coil spring 58 which biases the valve member 60 is used both for biasing the rotor 40 and for biasing the linear-motion shaft 50, and thereby reducing the number of components.

Other Embodiments

The present invention is not limited to the embodiment described above, and for example, embodiments which will be described below are also included in the technical scope of the present invention, and further, various variations other than those described below can be practiced without departing from the gist thereof.

Figure 6:
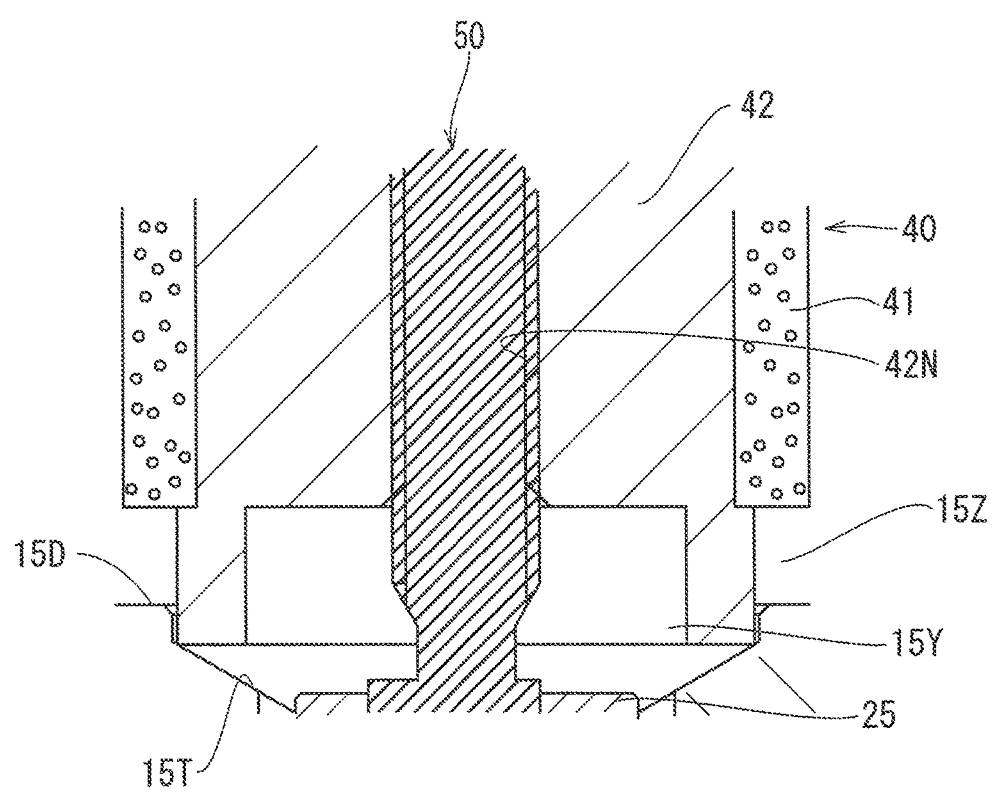
FIG. 6 is a side cross-sectional view in the vicinity of a rotor receiving portion according to a variation.
Figure 7:
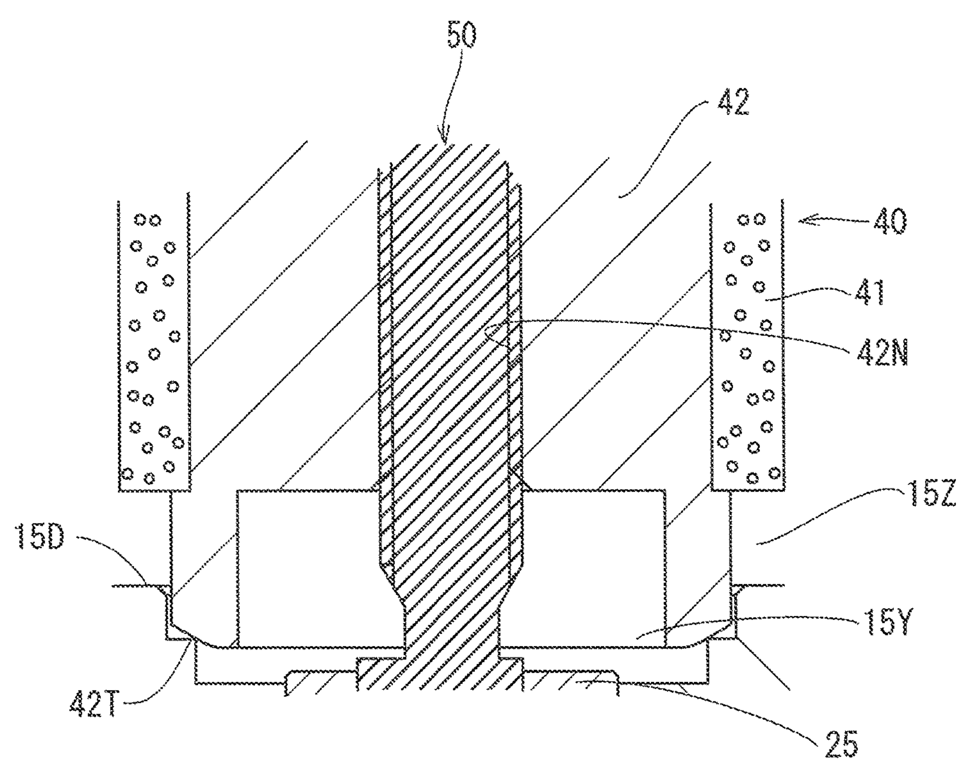
FIG. 7 is a side cross-sectional view in the vicinity of the rotor receiving portion according to the variation.

(1) Although in the embodiment described above, both the inner surface of the rotor receiving portion 15Y and the lower end surface of the rotary screwing cylinder 42 in the rotor 40 are tapered, only one of them may be tapered as shown in FIG. 6 or 7.

Figure 8:
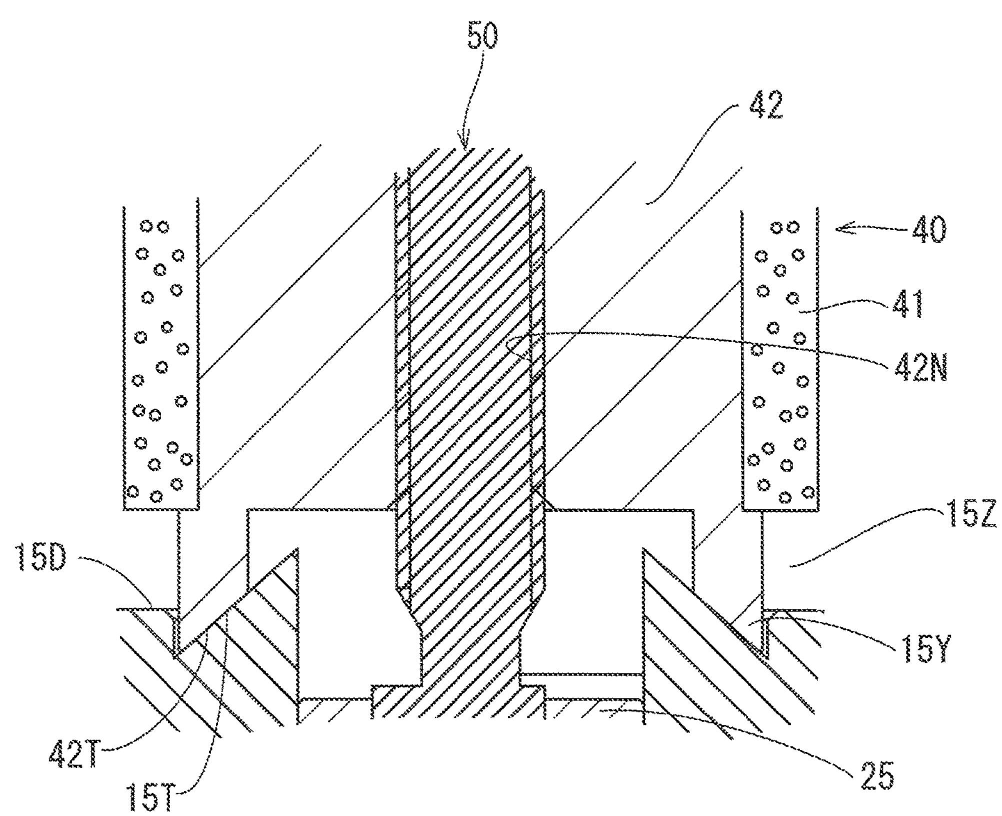
FIG. 8 is a side cross-sectional view in the vicinity of the rotor receiving portion according to a variation.

(2) Although in the embodiment described above, the tapered surface 15T of the rotor receiving portion 15Y and the tapered surface 42T of the rotary screwing cylinder 42 in the rotor 40 are inclined downward toward the center portion, they may be inclined upward toward the center portion as shown in FIG. 8.

(3) Although in the embodiment described above, the inner surface of the rotor receiving portion 15Y and the lower end surface of the rotary screwing cylinder 42 in the rotor 40 surface contact with each other, a protrusion, a roller or the like may be provided in one of the surfaces such that they contact with each other either at points or on lines. In such cases, the number of points or lines where the rotor receiving portion 15Y contacts with the rotary screwing cylinder 42 is preferably three or more.

(4) Although in the embodiment described above, the tapered surface 35T is formed in the pressing member 35, the tapered surface 35T may not be formed or the shape of the pressing member 35 may be flat.

(5) Although in the embodiment described above, the "valve member biasing means" also serves as the "shaft biasing means" in the present invention, they may be separately provided. As an example thereof, for example, a configuration may be cited in which a compression coil spring serving as the "shaft biasing means" in the present invention is inserted through the male screw portion 50N of the linear-motion shaft 50, and is accommodated in a compressed state between the lower opening edge of the female screw portion 42N of the rotary screwing cylinder 42, and the stepped surface between the male screw portion 50N and the sliding shaft portion 50B in the linear-motion shaft 50.

(6) The "rotor biasing means" in the present invention may be configured only with the compression coil spring 58 or may be configured only with the compression coil spring 36.

(7) Although in the embodiment described above, the "rotor biasing means" in the present invention is the compression coil springs 36 and 58, another elastic member (such as a plate spring or rubber) may be used, and for example, a configuration may be adopted in which a weight is attached to the rotor 40 so as to bias the rotor 40 by the weight thereof or a configuration may be adopted in which magnets are attached to the rotor 40 and the lid member 23 of the stator 11 so as to repel each other and to thereby bias the rotor 40 by the repulsive force thereof.

(8) Likewise, although in the embodiment described above, the "valve member biasing means" and the "shaft biasing means" in the present invention are the compression coil spring 58, another elastic member (such as a plate spring or rubber) may be used, and for example, a configuration may be adopted in which a weight is attached to the valve member 60 so as to bias the linear-motion shaft 50 by the weight thereof or a configuration may be adopted in which magnets are attached to the valve member 60 and the shaft support member 25 of the stator 11 so as to repel each other and to thereby bias the valve member 60 by the repulsive force thereof.

DESCRIPTION OF THE REFERENCE NUMERAL

- 10 Motor-operated valve
- 11 Stator
- 15T Tapered surface (stator-side sliding contact portion)
- 15Y Rotor receiving portion
- 18 Valve port
- 20 Stepping motor (motor)
- 25 Shaft support member
- 25D Shaft receiving hole
- 30 Guide shaft
- 31 Spiral guide
- 32 Stopper ring
- 35 Pressing member (intermediate member)
- 35T Tapered surface (stator-side sliding contact portion)
- 36 Compression coil spring (rotor biasing means)
- 40 Rotor
- 42 Rotary screwing cylinder
- 42A Upper end opening edge 42A (rotor-side sliding contact portion)
- 42T Tapered surface (rotor-side sliding contact portion)
- 50 Linear-motion shaft
- 55 Valve member component
- 58 Compression coil spring (valve biasing means, shaft biasing means, and rotor biasing means)
- 60 Valve member

The invention claimed is:

1. A motor-operated valve comprising:

a motor;

a base portion which is provided at one end of a stator of the motor;

a linear-motion shaft which is screwed into a rotor of the motor and which is supported by the base portion such that the linear-motion shaft can be moved linearly and cannot be rotated;

a valve port which is formed in the base portion;

a valve member which is provided at one end of the linear-motion shaft and which opens and closes the valve port;

a first contacting portion on the rotor and a second contacting portion on the stator or on an intermediate member disposed between the rotor and the stator, the first and the second contacting portions being provided in each of the intermediate member or the stator and the rotor, and contacting each other in a rotation axis direction of the rotor, a tapered surface being formed in one or both of the first contacting portion and the second contacting portion so as to center the rotor with respect to the stator, the first contacting portion and the second contacting portion being maintained in contact with each other regardless of whether the valve port is in an open state or a closed state; and a rotor biasing means which biases the rotor in the rotation axis direction such that the first contacting portion and the second contacting portion are pressed onto each other.

2. The motor-operated valve according to claim 1, comprising:

a shaft biasing means which biases the linear-motion shaft toward one of linear-motion directions with respect to the rotor.

3. The motor-operated valve according to claim 1, wherein the valve port is arranged across the valve member on a side opposite to the linear-motion shaft, and the motor-operated valve comprising:

a linear-motion coupling mechanism which couples the valve member to one end portion of the linear-motion shaft such that the valve member can be linearly moved and cannot be separated; and a valve member biasing means which biases the valve member toward the valve port with respect to the linear-motion shaft.

4. The motor-operated valve according to claim 1, comprising:

a shaft biasing means which biases the linear-motion shaft toward one of linear-motion directions with respect to the rotor.

5. The motor-operated valve according to claim 4, wherein the valve port is arranged across the valve member on a side opposite to the linear-motion shaft, and the motor-operated valve comprising:

a linear-motion coupling mechanism which couples the valve member to one end portion of the linear-motion shaft such that the valve member can be linearly moved and cannot be separated; and a valve member biasing means which biases the valve member toward the valve port with respect to the linear-motion shaft.

6. The motor-operated valve according to claim 1, wherein the valve port is arranged across the valve member on a side opposite to the linear-motion shaft, and the motor-operated valve comprising:

a linear-motion coupling mechanism which couples the valve member to one end portion of the linear-motion shaft such that the valve member can be linearly moved and cannot be separated; and a valve member biasing means which biases the valve member toward the valve port with respect to the linear-motion shaft.

7. The motor-operated valve according to claim 6, comprising:

a pressure receiving portion which is formed in the valve member and which is extended further laterally than the linear-motion shaft;

an opposing portion which is formed in the base portion and which opposes the pressure receiving portion from a side opposite to the valve port; and a compression coil spring which is in a compressed state between the pressure receiving portion and the opposing portion and which serves as the valve member biasing means.

8. The motor-operated valve according to claim 6, wherein the valve member biasing means also serves as the rotor biasing means.

9. The motor-operated valve according to claim 8, comprising:

a pressure receiving portion which is formed in the valve member and which is extended further laterally than the linear-motion shaft;

an opposing portion which is formed in the base portion and which opposes the pressure receiving portion from a side opposite to the valve port; and a compression coil spring which is in a compressed state between the pressure receiving portion and the opposing portion and which serves as the valve member biasing means.

10. The motor-operated valve according to claim 1, wherein the first contacting portion is provided in both end portions of the rotor, the second contacting portion is provided in two positions which sandwich the rotor in the rotation axis direction, and the second contacting portion in at least one of the two positions is provided in the intermediate member that can be linearly moved with respect to a main body of the stator, and an elastic member serving as the rotor biasing means is provided between the intermediate member and the main body of the stator.

11. The motor-operated valve according to claim 10, wherein a tapered surface is formed in one or both of the first contacting portion and the second contacting portion so as to center the rotor with respect to the stator.

12. The motor-operated valve according to claim 10, comprising:

a shaft biasing means which biases the linear-motion shaft toward one of linear-motion directions with respect to the rotor.

13. The motor-operated valve according to claim 10, wherein the valve port is arranged across the valve member on a side opposite to the linear-motion shaft, and the motor-operated valve comprising:

a linear-motion coupling mechanism which couples the valve member to one end portion of the linear-motion shaft such that the valve member can be linearly moved and cannot be separated; and a valve member biasing means which biases the valve member toward the valve port with respect to the linear-motion shaft.

14. The motor-operated valve according to claim 13, comprising:

a pressure receiving portion which is formed in the valve member and which is extended further laterally than the linear-motion shaft;

an opposing portion which is formed in the base portion and which opposes the pressure receiving portion from a side opposite to the valve port; and a compression coil spring which is in a compressed state between the pressure receiving portion and the opposing portion and which serves as the valve member biasing means.

15. The motor-operated valve according to claim 10, comprising:

a guide shaft which is attached to the main body of the stator and which is extended coaxially with the linear-motion shaft;

a spiral guide which is provided on an outer surface of the guide shaft; and a stopper ring which is attached to the guide shaft and which is moved from an upper end to a lower end of the spiral guide according to a rotation of the rotor so as to regulate an amount of rotation of the rotor, wherein the intermediate member is supported by the guide shaft.

16. The motor-operated valve according to claim 15, wherein a tapered surface is formed in one or both of the first contacting portion and the second contacting portion so as to center the rotor with respect to the stator.

17. The motor-operated valve according to claim 15, comprising:

a shaft biasing means which biases the linear-motion shaft toward one of linear-motion directions with respect to the rotor.

18. The motor-operated valve according to claim 15, wherein the valve port is arranged across the valve member on a side opposite to the linear-motion shaft, and the motor-operated valve comprising:

a linear-motion coupling mechanism which couples the valve member to one end portion of the linear-motion shaft such that the valve member can be linearly moved and cannot be separated; and a valve member biasing means which biases the valve member toward the valve port with respect to the linear-motion shaft.

19. The motor-operated valve according to claim 18, comprising:

a pressure receiving portion which is formed in the valve member and which is extended further laterally than the linear-motion shaft;

an opposing portion which is formed in the base portion and which opposes the pressure receiving portion from a side opposite to the valve port; and a compression coil spring which is in a compressed state between the pressure receiving portion and the opposing portion and which serves as the valve member biasing means.

* * * * *